United States Patent Office 3,320,032
Patented May 16, 1967

3,320,032
EXTRACTING IRON FROM ALUMINUM SALT SOLUTIONS USING BIS(2-ETHYLHEXYL) PHOSPHORIC ACID
Harold L. Feller, Newark, Del., assignor to J. M. Huber Corporation, Locust, N.J., a corporation of New Jersey
No Drawing. Filed Sept. 5, 1962, Ser. No. 221,436
6 Claims. (Cl. 23—312)

This invention relates to a process for the selective removal of iron from soluble aluminum salt liquors using organic hydrogen phosphates.

The use of organic hydrogen phosphates to remove relatively expensive metal values from various leach liquors is known. For example, known processes have been directed toward extracting metal values from acid leach liquors of uranium ores for the purpose of recovering valuble metals from the organic phase. The leach liquor in the aqueous phase is then discarded. However, no practical prior art methods are known for the extraction of inexpensive and undesirable metal contaminants from leach liquors.

When clays containing a high percentage of aluminum, for example, bauxite, kaolin, montmorillonite, nacrite, dickite, bentonite and the like are leached with a strong mineral acid such as sulfuric acid, hydrochloric acid, or nitric acid, the aluminum is extracted or "leached" from the clay in the form of the salt of the leaching acid. These aluminum salts contain, as a general rule, amounts of iron, in both ferric and ferrous form, which make them unacceptable for many commercial uses.

An effective practical method of removing these iron impurities from soluble inorganic aluminum salts has been long sought in vain by those skilled in the art.

I have discovered that by the use of an organic extractant as hereinafter described, iron impurities can be effectively removed from aluminum salts to any degree required and the resulting turbid solution can subsequently be clarified by heat.

An object of this invention is to provide a method for the removal of iron impurities from soluble inorganic aluminum salts. Another object of this invention is to provide clear, colorless aluminum salt solutions.

Previously the processes directed to the use of organic phosphate esters for extracting metals from leach liquors were concerned mainly with the recovery of valuable metals from the organic phase, and the aqueous phase was discarded. In the process of the present invention it is the major component of the aqueous leach liquor which is of interest. The aqueous leach liquor is of limited commercial value because of the presence of dissolved iron impurities. A major problem occurs when leach liquors containing aluminum salts are treated with organic phosphate esters. After the extraction of the iron into the organic phase, the aqueous phase remains cloudy, whereas a clear liquor is desired. This problem is solved according to this invention by heating the cloudy aqueous phase to temperatures below the boiling point, higher temperatures are operable but unnecessary. The result of this heating is, surprisingly, that the aqueous phase clears up and the organic residue, which causes the cloudiness, solidifies to a wax-like substance and floats to the top of the aqueous phase where it is easily removed.

The process of this invention can be best described in five steps: (1) Preparation of aluminum salt solution for removal of iron; (2) contacting of aluminum salt solution with organic hydrogen phosphate; (3) phase separation; (4) clarification of aqueous phase (5) regeneration of the organic extractant.

1. PREPARATION OF ALUMINUM SALT SOLUTION FOR REMOVAL OF IRON

The leach liquor resulting from the extraction of aluminum from clay with a strong mineral acid contains the aluminum salt of the acid used, some unreacted acid, iron in ferrous or ferric form and silica. The silica is removed prior to the extraction of iron in order to prevent the formation of stable silica-organic emulsions at the aqueous-organic interface. A typical analysis, after removal of silica, of a leach liquor formed by the action of sulfuric acid on clay is as follows:

$Al_2(SO_4)_3 \cdot 14H_2O$—474–664 gms./liter (3.95–5.53 lbs./gal.)
Free sulfuric acid—.039–.124 molar
Total iron as Fe—.884–1.26 gms./liter
Percent iron as ferrous—25–49%
pH—~1

A typical analysis, after removal of silica, of a leach liquor formed by the action of nitric acid on clay is as follows:

$Al(NO_3)_3 \cdot 9H_2O$—731 gms./liter (6.09 lbs./gal.)
Free nitric acid—0.05 molar
Total iron as Fe—0.60–0.73 gms./liter
Percent iron as ferrous—0
pH—~1

Organic hydrogen phosphates are selective complexing agents for iron and will extract iron in ferric form from the leach liquor with little extraction of alumiunm. Monovalent and divalent ions such as calcium, sodium and ferrous are not extracted to any appreciable extent.

In acid media, the extraction coefficient for ferrous iron is highly unfavorable which necessitates the oxidation of the ferrous iron to ferric iron prior to the extraction with organic hydrogen phosphates. This oxidation can be accomplished by contacting the leach liquor with an oxidizing agent such as peroxides, oxygen and the like. I have found that hydrogen peroxide is satisfactory for the purpose of this invention. The liquor containing aluminum sulfate requires this preoxidation treatment. However, since the nitric acid used to leach clay is a strong oxidizing agent, the liquor containing aluminum nitrate does not have to be preoxidized because all its iron is in the ferric state.

2. CONTACTING OF ALUMINUM SALT SOLUTION WITH ORGANIC HYDROGEN PHOSPHATE

Iron is extracted from the aluminum salt liquor by intimately contacting the liquor with the organic extractant either by vigorous mechanical shaking, mixing, or by allowing the phases to flow countercurrently. A thorough contacting of extractant and liquor results in a more efficient extraction and a shorter time necessary to effect the iron removal.

Generally the organic hydrogen phosphate is added to the aluminum salt liquor, although they can be commingled or the liquor can be added to the extractant. The effective aqueous to organic ratios of aluminum salt liquor to organic extractant is from about 1 to 1 to 60 to 1. These ratios are effective in reducing the iron content of the liquors from about 1 gram per liter to less than 0.001 gram per liter (1 part per million).

Organic hydrogen phosphates are dissolved in an organic solvent to facilitate handling. In general, the solvent acts merely as an extender to enhance contact and as a diluent to decrease the viscosity of the organic phase. The main criteria for an acceptable solvent in the process of this invention are water immiscibility and inertness. While any organic solvent which fulfills these requirements is applicable, the preferred solvents are heptane and kerosene.

The concentration of the aluminum salt liquors has little or no effect on the removal of iron therefrom, therefore, any concentration up to the saturation point of the salt is operable in practicing this invention.

The maximum iron removal capacity of the organic extractant varies with its concentration. For example, extraction tests have established that the maximum iron capacity of 1 molar organic hydrogen phosphate in a typical aluminum nitrate leach liquor is 0.5 mole of iron per mole of extractant. In a typical aluminum sulfate leach liquor the maximum iron capacity of 1 molar organic hydrogen phosphate is 0.33 mole of iron per mole of extractant.

When using 0.25 molar extractant at an aqueous to organic phase ratio of 40, the iron capacity is approximately 0.8 mole of iron per mole of extractant in either the sulfate or nitrate salt liquors. This indicates that the mechanism of extraction differs between the 0.25 and 1 molar extractant concentrations. While the 0.25 molar concentration is most effective, this invention can be carried out using from 0.0125 to 3 molar solutions of extractants.

The extractants operable in this invention can be illustrated by the formula

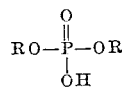

wherein R is an organic radical such as a higher alkyl radical with either straight or branched chains containing from 7 to 18 carbon atoms, an aryl radical such as benzyl or naphthyl, an alkyl aryl radical such as tolyl or an ethylenically unsaturated group. The R's can be the same or different. The character of the organic substituent is important only insofar as it imparts water insolubility to the extractant and does not interfere with the iron removal from the aqueous leach liquor. The preferred substituents are the higher alkyl groups.

For purposes of illustration, bis (2-ethylhexyl) phosphoric acid (DOHP) can be considered typical of this group of organic extractants.

The differences in the iron capacity of the extractant in the sulfate and nitrate liquors can be explained by assuming that the nitrate oxyanion contributes in the complex formation. The following equations illustrate this theory:

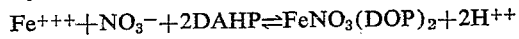

This equation shows the reaction of 2 moles of DOHP and a nitrate radical with 1 mole of ferric iron.

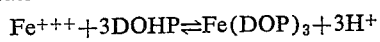

This equation shows the reaction of 3 moles of DOHP to complex each mole of iron in sulfate liquor.

These equations hold true only for the concentrated (at least 1 molar) extractants. The more dilute solutions (about 0.25 molar) of extractant exhibit the same iron capacity in either sulfate or nitrate liquors. This capacity is 2 to 3 times the capacity of the more concentrated extractant. This is true because the concentrated DOHP dimerizes while the more dilute solutions do not dimerize to any appreciable extent. This effect is illustrated in Table I.

TABLE I (a) Stage extraction of iron from aluminum sulfate with 1 molar DOHP in kerosene—

*Initial concentration*

| Aqueous (gr. Fe/l.): | A/O ratio |
|---|---|
| 1.26 | 40 |
| 0.90 | 40 |
| 0.544 | 40 |
| 0.283 | 40 |
| 0.107 | 40 |
| 0.063 | 40 |

*Equilibrium concentration*

| Aqueous (gr. Fe/l.): | Organic (gr. Fe/l.) |
|---|---|
| 0.900 | 14.40 |
| 0.544 | 14.20 |
| 0.283 | 10.50 |
| 0.107 | 7.04 |
| 0.063 | 1.79 |
| 0.026 | 1.46 |

(b) Extraction of iron from aluminum sulfate with 0.25 molar DOHP in kerosene—

*Initial concentration*

| Aqueous (gr. Fe/l.): | A/O ratio |
|---|---|
| 1.17 | 1 |
| 1.17 | 5 |
| 1.17 | 10 |
| 1.17 | 40 |

*Equilibrium concentration*

| Aqueous (gr. Fe/l.): | Organic (gr. Fe/l.) |
|---|---|
| 0.016 | 1.054 |
| 0.120 | 5.25 |
| 0.250 | 9.20 |
| 0.900 | 10.80 |

(c) Extraction of iron from aluminum nitrate with 1.0 molar DOHP in kerosene—

*Initial concentration*

| Aqueous (gr. Fe/l.): | A/O ratio |
|---|---|
| 0.73 | 10 |
| 0.73 | 20 |
| 0.73 | 40 |
| 0.73 | 60 |

*Equilibrium concentration*

| Aqueous (gr. Fe/l.): | Organic (gr. Fe/l.) |
|---|---|
| 0.001 | 7.29 |
| 0.007 | 14.46 |
| 0.070 | 26.60 |
| 0.224 | 30.36 |

(d) Extraction of iron from aluminum nitrate with 0.25 molar DOHP in kerosene—

*Initial concentration*

| Aqueous (gr. Fe/l.): | A/O ratio |
|---|---|
| 0.73 | 5 |
| 0.73 | 10 |
| 0.73 | 20 |
| 0.73 | 40 |

*Equilibrium concentration*

| Aqueous (gr. Fe/l.): | Organic (gr. Fe/l.) |
|---|---|
| 0.008 | 3.61 |
| 0.90 | 6.40 |
| 0.310 | 8.40 |
| 0.440 | 11.60 |

Generally, the iron can be extracted much more rapidly from the nitrate liquor than from either the chloride liquor or sulfate liquor. Tests show that with an aqueous to organic ratio (A/O) of 10, the equilibration time for a nitrate liquor contacted with DOHP is less than one hour, while the corresponding sulfate liquor requires over two hours. Table II illustrates this.

TABLE II (a) Aluminum nitrate—

*Initial concentrations*

| Aqueous (gr. Fe/l.): | A/O time, min. |
|---|---|
| 0.600 | 10/15 |
| 0.600 | 10/30 |

0.600 — 10/60
0.600 — 10/60
0.600 — 10/120

Equilibrium concentrations

Aqueous (gr. Fe/l.):     Organic (gr. Fe/l.)
0.010 — 5.90
0.002 — 5.98
0.001 — 5.99
0.001 — 5.99

(b) Aluminum sulfate—

Initial concentrations

Aqueous (gr. Fe/l.):     A/O time, min.
1.17 — 10/15
1.17 — 10/30
1.17 — 10/60
1.17 — 10/120
1.17 — 10/240
0.894 — 10/1
0.894 — 10/3
0.894 — 10/30

Equilibrium concentrations

Aqueous (gr. Fe/l.):     Organic (gr. Fe/l.)
0.360 — 8.10
0.348 — 8.22
0.220 — 9.50
0.152 — 10.18
0.110 — 10.60
0.728 — 1.66
0.532 — 3.62
0.308 — 5.86

From the foregoing it can be seen that it is possible to remove the iron from aluminum salt solutions by a single contacting of the liquor with the organic extractant, however, this method is not as economical as removing the iron by contacting the liquor with the extractant in stages. The analysis of the various stagewise extractions show the differences in the effect of the dilute extractant as opposed to the concentrated extractant and also illustrate the effect of the aqueous to organic ratio (A/O ratio).

TABLE III

[(a) Aluminum Sulfate and 1 Molar DOHP]

| A/O Ratio | Initial Fe gr./l. | 1st stage | 2nd stage | 3rd stage | 4th stage | 5th stage |
|---|---|---|---|---|---|---|
| 10 | 0.9 | 0.115 | 0.015 | 0.001 | | |
| 20 | 0.9 | 0.290 | 0.040 | 0.010 | 0.001 | |

[(b) Aluminum Sulfate and 0.25 Molar DOHP]

| A/O Ratio | Initial Fe gr./l. | 1st stage | 2nd stage | 3rd stage | 4th stage | 5th stage |
|---|---|---|---|---|---|---|
| 10 | 0.9 | 0.170 | 0.020 | 0.0005 | 0.001 | |
| 20 | 0.9 | 0.400 | 0.115 | 0.025 | 0.005 | 0.001 |

[(c) Aluminum Nitrate and 1 Molar DOHP]

| A/O Ratio | Initial Fe gr./l. | 1st stage | 2nd stage | 3rd stage | 4th stage | 5th stage |
|---|---|---|---|---|---|---|
| 10 | 0.7 | 0.001 | | | | |
| 20 | 0.7 | 0.007 | 0.001 | | | |
| 40 | 0.7 | 0.060 | 0.001 | | | |

[(d) Aluminum Nitrate and 0.25 Molar DOHP]

| A/O Ratio | Initial Fe gr./l. | 1st stage | 2nd stage | 3rd stage | 4th stage | 5th stage |
|---|---|---|---|---|---|---|
| 10 | 0.7 | 0.070 | 0.001 | | | |
| 20 | 0.7 | 0.250 | 0.015 | 0.001 | | |

The data clearly indicates that it is most advantageous to use a dilute extractant at high aqueous to organic ratios. For example, an aqueous to organic ratio of 10 using 1 molar DOHP with aluminum sulfate requires 0.3 mole of extractant to lower the iron down to 1 part per million, but an aqueous to organic ratio of 20 using 0.25 molar DOHP with aluminum sulfate, requires 0.0625 mole of extractant to lower the iron down to 1 part per million.

3. PHASE SEPARATION

In the aqueous-organic system of the present invention, the aluminum salt liquor comprises the aqueous phase, while the extractant is contained in the lighter organic phase.

After contacting the aqueous liquor with the organic extractant, the mixture is allowed to settle and a phase separation occurs in from 5 to 30 minutes in which the organic phase rises to the top accompanied by the appearance of a sharply defined interface. In general a low aqueous to organic ratio enhances the phase separation.

To effect this separation it is only necessary to store the solution and the layers will separate by gravity. If it is desired to accelerate the phase separation, a centrifuge may be used.

4. CLARIFICATION OF AQUEOUS PHASE

In many liquid-liquid extractions, an emulsion in one or both of the phases is likely to result. In the process of the present invention the formation of a fairly stable oil-in-water emulsion occurs in the aqueous phase producing an aluminum salt liquor having a cloudy appearance. While the aqueous phase is essentially iron-free, it cannot for most practical purposes be utilized commercially. To remove this cloudy appearance requires a treatment which not only clarifies the aqueous layer but also effectively removes the cause of the cloudiness, e.g., the organic material. The presence of the organic material in the aqueous phase is objectionable because under certain conditions of treatment an explosive atmosphere might be created, for example, if the liquor were used in a thermal process.

The method we have discovered for removing the cloudiness from the aqueous phase involves separating the aqueous phase from the organic phase, followed by heating the aqueous liquor while agitating. At temperatures near boiling, the organic forms a gummy mass which tends to collect and float on the surface. After solidification, the organic mass can be easily removed by skimming, screening, or filtering.

This treatment results in a clear liquor. The liquor in this condition is suitable for all commercial uses, particularly where color is undesirable such as in the manufacture of blueprint and photographic papers.

This method of removing the residual traces of organic material from the extracted liquors is fast and effective. Tests have shown that it is the presence of the aluminum salt which causes the organic to solidify upon heating.

5. REGENERATION OF THE ORGANIC EXTRACTANT

The organic extractant can be regenerated to 98–99% efficiency by several conventional methods. The most effective method is to strip the iron values from the extractant by treating it with concentrated phosphoric acid. Other stripping methods useful are the addition of aqueous or anhydrous ammonia to remove the iron. Sodium carbonate can also be used.

The following example is representative of the process of this invention and the invention is not intended to be limited by it.

*Example.*—To a 3-necked, 3-liter flask equipped with a stirrer condenser and thermometer and containing 1000 milliliters of concentrated (650 gms. $Al(NO_3)_3 \cdot 9H_2O$ per liter) aluminum nitrate leach liquor containing 0.6 gram of ferric iron per liter was added 100 milliliters of 1 molar DOHP (bis (2-ethylhexyl) phosphoric acid) in kerosene. The reactants were mixed for one hour then allowed to settle. Two layers resulted, an upper organic layer which was clear and a lower aqueous aluminum nitrate liquor which was cloudy after four hours settling. Analysis of the aqueous layer of NH₄SCN showed the iron content to be 0.004 gram of iron per liter.

The upper organic layer was removed and the aqueous layer was again treated with a fresh 100 ml. portion of 1 molar DOHP in kerosene. The settling and separating procedure was repeated and upon testing for iron, the cloudy aqueous layer contained less than 0.001 gram of iron per liter. The cloudy aqueous aluminum nitrate liquor was allowed to settle for 5 days but remained cloudy.

100 milliliters of the cloudy aluminum salt liquor was heated in the reaction flask at below reflux temperature. At about 80° C. the cloudy liquor became clear as the organic residue (mostly DOHP) coagulated and floated to the surface. The organic coagulant was then removed by skimming. The resulting aqueous liquor was clear, and remained clear upon cooling.

The organic layer (DOHP) was regenerated by contacting with concentrated phosphoric acid.

The procedure of the example was repeated using 1000 mls. of preoxidized aluminum sulfate solution (650 gms. of $Al_2(SO_4)_3 \cdot 14H_2O$ per liter) containing 1.1 grams of iron per liter. The resulting aqueous phase was cloudy and the salt contained less than 0.001 gm. of iron per liter. The cloudy aqueous solution was cleared up by heating to about 80° C. and the coagulant was skimmed off.

The foregoing is illustrative only and additional modifications may be made without deaprting from the substance of the invention as defined in the appended claims.

I claim:
1. The process for producing a colorless substantially iron-free aqueous aluminum nitrate solution which comprises: (1) contacting said aqueous solution containing iron impurities and at least 65% aluminum nitrate with sufficient hydrogen peroxide to oxidize all of the iron present to the ferric state, (2) intimately contacting said iron containing concentrated aluminum nitrate solution with bis (2-ethylhexyl) phosphoric acid in kerosene for a time sufficient to remove substantially all the iron, allowing the aqueous and organic phases to separate into a clear upper organic layer and a cloudy lower aqueous layer containing organic solvent residue, removing the organic layer, heating while agitating the cloudy aqueous layer until said organic residue coagulates, skimming the coagulant off the aqueous layer, and recovering the clear aqueous substantially iron-free aluminum nitrate.

2. The process of claim 1 wherein the dialkyl hydrogen phosphate is 0.25 molar bis (2-ethylhexyl) phosphoric acid in kerosene.

3. The process of claim 1 wherein the dialkyl hydrogen phosphate is 1 molar bis (2-ethylhexyl) phosphoric acid in kerosene.

4. The process for producing a colorless substantially iron-free aqueous aluminum sulfate solution which omprises: (1) contacting said aqueous solution containing iron impurities and at least 65% aluminum sulfate with sufficient hydrogen peroxide to oxidize all of the iron present to the ferric state, (2) intimately contacting said iron containing concentrated aluminum sulfate solution with bis (2-ethylhexyl) phosphoric acid in kerosene for a time sufficient to remove substantially all the iron, allowing the aqueous and organic phases to separate into a clear upper organic layer and a cloudy lower aqueous layer containing organic solvent residue, removing the organic layer, heating while agitating the cloudy aqueous layer until said organic residue coagulates, skimming the coagulant off the aqueous layer, and recovering the clear aqueous substantially iron-free aluminum sulfate.

5. The process of claim 4 wherein the dialkyl hydrogen phosphate is 0.25 molar bis (2-ethylhexyl) phosphoric acid in kerosene.

6. The process of claim 4 wherein the dialkyl hydrogen phosphate is 1 molar bis (2-ethylhexyl) phosphoric acid in kerosene.

References Cited by the Examiner
UNITED STATES PATENTS

| 1,870,214 | 8/1932 | Aickelin | 23—312 |
| 2,249,761 | 7/1941 | Hixson | 23—312 |
| 2,860,031 | 11/1958 | Grinstead | 23—14.5 |
| 2,883,264 | 4/1959 | Warf | 23—102 X |
| 2,982,602 | 5/1961 | Wilson | 23—102 X |
| 3,211,521 | 10/1965 | George | 23—312 X |
| 3,211,524 | 10/1965 | Hyde | 23—312 X |

OTHER REFERENCES

Hodgman: "Handbook of Chemistry and Physics," Chemical Rubber Pub. Co., Cleveland, Ohio, 31st ed., 1949, pp. 394–397.

NORMAN YUDKOFF, *Primary Examiner.*

GEORGE D. MITCHELL, *Examiner.*

M. H. SILVERSTEIN, S. EMERY, *Assistant Examiners.*